United States Patent
Telfer et al.

[11] Patent Number: 5,812,186
[45] Date of Patent: Sep. 22, 1998

[54] THREE-DIMENSIONAL DISPLAY METHOD(S) AND APPARATUS

[75] Inventors: Stephen J. Telfer; Mark R. Mischke, both of Arlington, Mass.

[73] Assignee: Polaroid Corporation, Cambridge, Mass.

[21] Appl. No.: 279,434

[22] Filed: Jul. 25, 1994

[51] Int. Cl.$^6$ .............. G02B 27/22; G02F 1/01; H04N 13/00
[52] U.S. Cl. .............................. 348/54; 345/32
[58] Field of Search ................. 385/130; 359/393; 250/227.21; 345/4, 5, 6, 32, 102; 315/169.4; 40/411; 348/54

[56] References Cited

U.S. PATENT DOCUMENTS

| | | |
|---|---|---|
| 1,955,273 | 7/1934 | Deninson . |
| 2,268,351 | 12/1941 | Tanaka . |
| 3,597,042 | 8/1971 | Favre . |
| 4,021,846 | 5/1977 | Roese . |
| 4,041,476 | 8/1977 | Swainson . |
| 4,087,159 | 5/1978 | Ulrich . |
| 4,249,796 | 2/1981 | Sincerbox et al. . |
| 4,333,707 | 6/1982 | West . |
| 4,344,668 | 8/1982 | Gunther et al. . |
| 4,391,499 | 7/1983 | Whitlock, III . |
| 4,414,565 | 11/1983 | Shanks . |
| 4,561,017 | 12/1985 | Greene . |
| 4,588,259 | 5/1986 | Sheiman . |
| 4,671,606 | 6/1987 | Yevick . |
| 4,717,949 | 1/1988 | Eichenlaub . |
| 4,719,482 | 1/1988 | Hora . |
| 4,736,246 | 4/1988 | Nishikawa . |
| 4,737,014 | 4/1988 | Green . |
| 4,815,827 | 3/1989 | Lane . |
| 4,822,145 | 4/1989 | Staelin ........................ 350/345 |
| 4,829,365 | 5/1989 | Eichenlaub . |
| 4,890,902 | 1/1990 | Doane et al. . |
| 4,896,150 | 1/1990 | Brotz . |
| 5,009,483 | 4/1991 | Rockwell, III .................. 350/96.24 |
| 5,045,847 | 9/1991 | Tarui et al. ..................... 340/783 |
| 5,106,181 | 4/1992 | Rockwell, III ..................... 385/2 |
| 5,113,272 | 5/1992 | Reamey ........................ 359/53 |
| 5,144,416 | 9/1992 | Hart ............................. 385/56 |
| 5,321,258 | 6/1994 | Kinney ...................... 250/227.21 |
| 5,347,378 | 9/1994 | Handschy et al. ............... 359/53 |
| 5,402,143 | 3/1995 | Ge et al. ........................ 345/102 |

FOREIGN PATENT DOCUMENTS

| | | |
|---|---|---|
| 0 056 843 A2 | 8/1982 | European Pat. Off. . |
| 0 535 402 A1 | 4/1993 | European Pat. Off. . |
| 2 206 763 | 1/1989 | United Kingdom . |

*Primary Examiner*—Mark R. Powell
*Attorney, Agent, or Firm*—Francis J. Caufield; Joseph Stecewycz

[57] ABSTRACT

Method(s) and associated apparatus are provided for the display of three-dimensional still or dynamic images in either monochrome or color. Several embodiments are described and each includes either one or more waveguide arrangements by which images formed in two-dimensional planes can be optically separated in the third dimension by arranging for their selective viewing along paths having different optical path lengths to impart a perception of depth to the image.

25 Claims, 8 Drawing Sheets

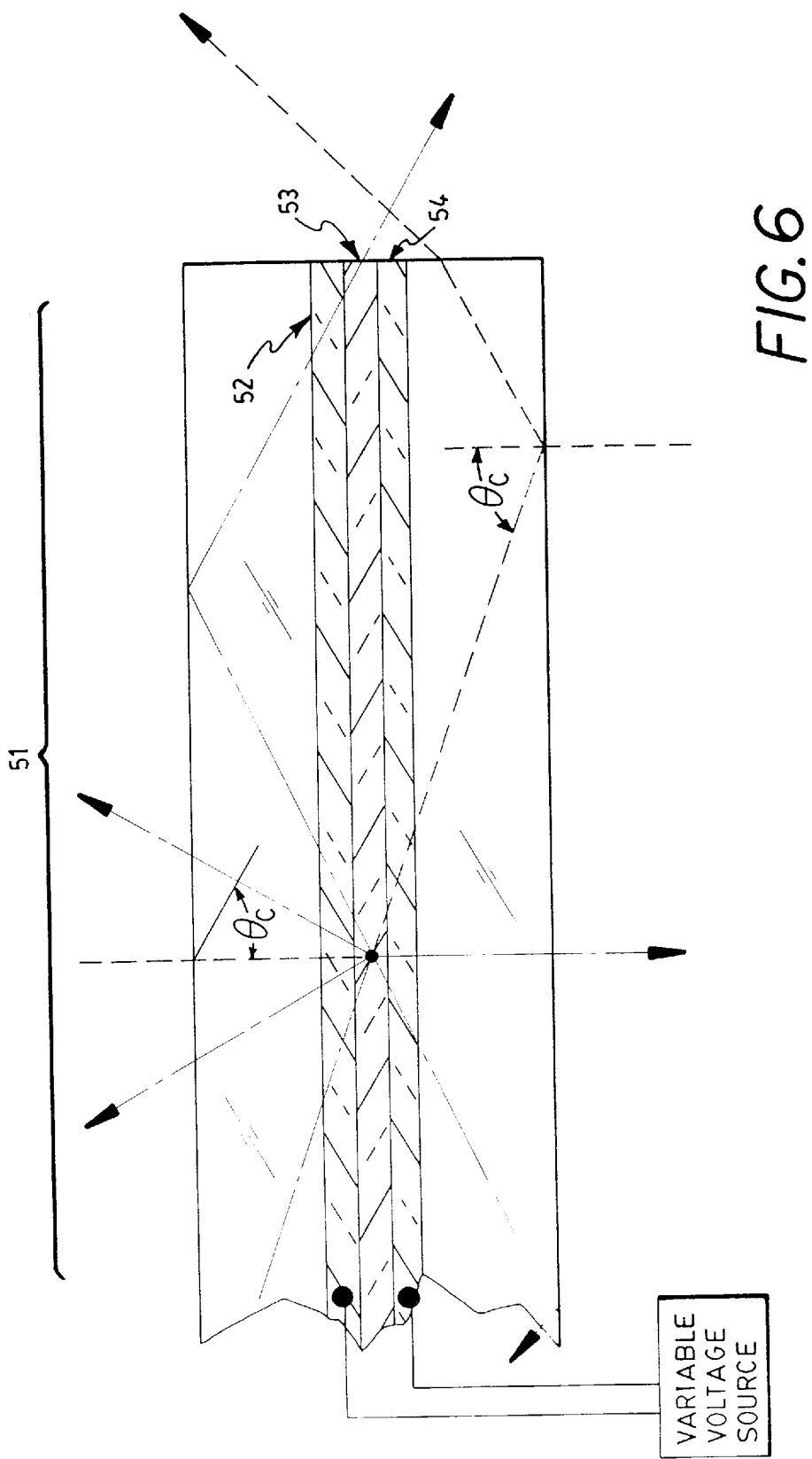

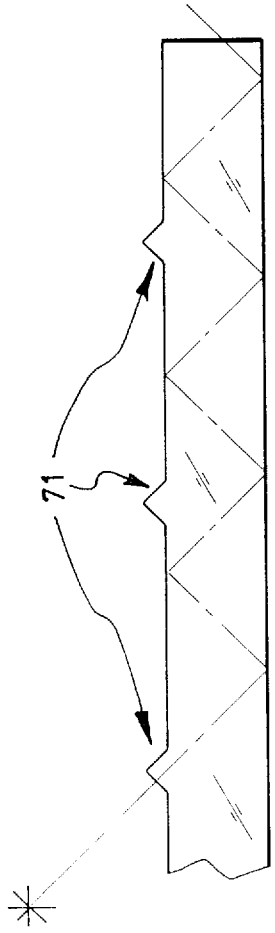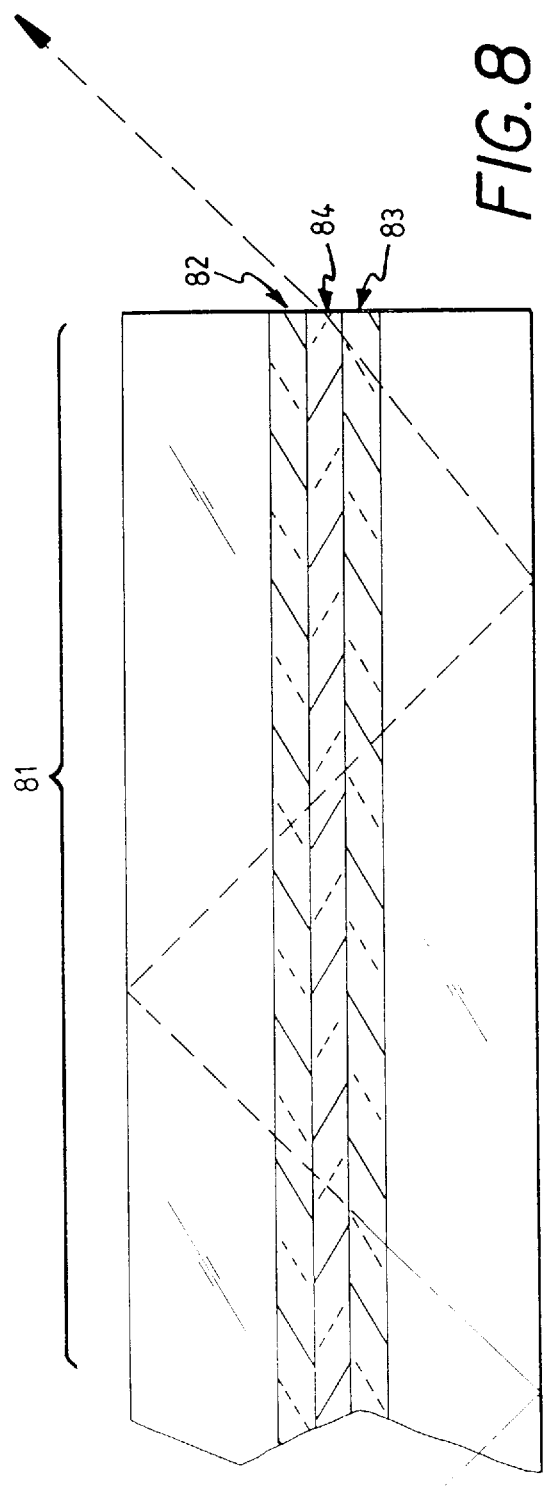

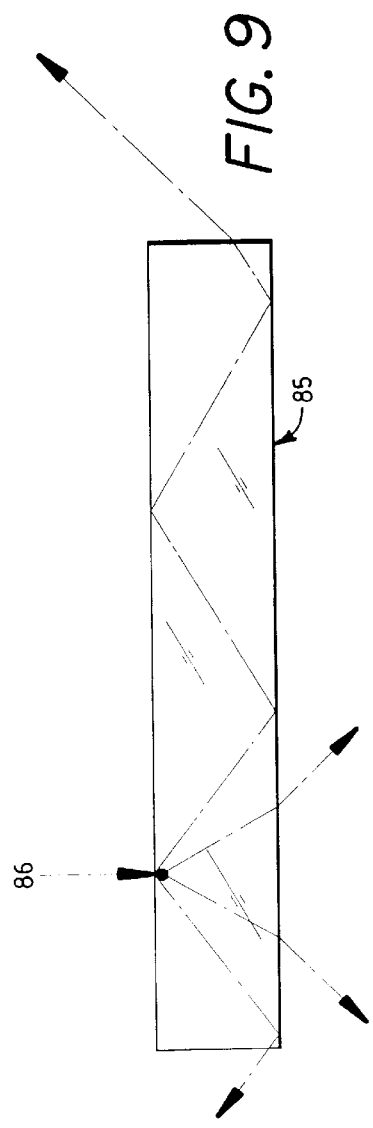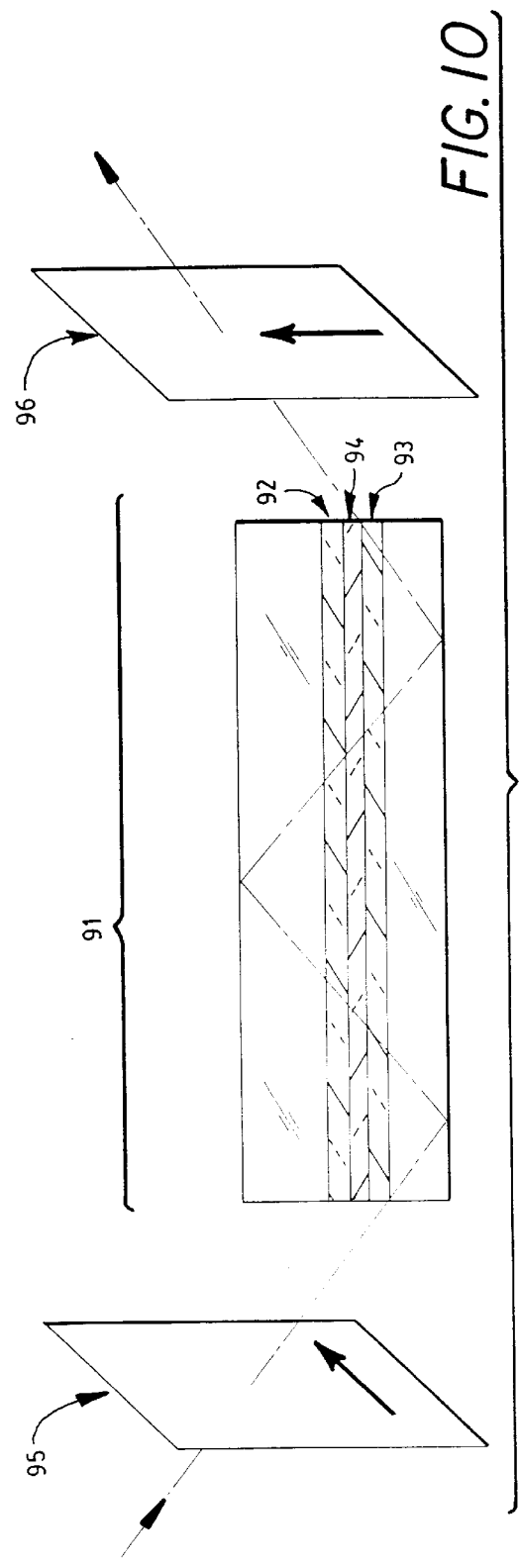

THREE-DIMENSIONAL DISPLAY METHOD(S) AND APPARATUS

BACKGROUND OF THE INVENTION

1. Field of the Invention

This invention relates to displays, and to methods for displaying three-dimensional images.

2. Background of the Prior Art

Digital representations of three-dimensional objects are now routinely stored and manipulated in computers. Such representations may be obtained by acquiring information about physical objects as, for example, aircraft whose position in space have been monitored by radar or a patient whose body has been imaged using X-ray or magnetic resonance methods. Alternatively, the representation may be of a wholly imaginary or virtual object which has been designed using a computer drawing or modelling program (usually known as "computer assisted design", or "CAD").

It is often necessary to display such representations of a three-dimensional object in such a way that the spatial relationships between its various parts are apparent. This can only be done in a limited way using a conventional two-dimensional display because, although such a display can provide what have been described as "psychological depth cues", for example, linear perspective, they are unable to provide the "physiological depth cues" presented by a real three-dimensional object. A discussion of psychological and physiological depth cues is provided in "Direct Volume Display Devices", by T. E. Clifton III and F. L. Wefer, IEEE Computer Graphics and Applications, pp. 57–65 (1993).

The physiological depth cues discussed in the reference cited are: "accommodation (change in focal length of the eye lens), convergence (inward rotation of the eyes), binocular disparity (differences between left and right eye images), and motion parallax (image changes due to motion of the observer)." A true three-dimensional display should provide all of these physiological depth cues.

Many three-dimensional displays are stereoscopic in design, which is to say that they present a different two-dimensional image to each eye of the viewer. In such displays, changes in accommodation, convergence, and motion parallax are not provided. To provide convergence changes and motion parallax, it is necessary to incorporate methods for tracking the position of the viewer's head relative to the display and to use this information to alter the image being displayed. Not only is this cumbersome, it is also difficult to implement for multiple viewers.

Many stereoscopic displays also require the viewer to wear special glasses or a headset in which two two-dimensional displays are mounted. Those which do not may be termed autostereoscopic. Some methods for providing such autostereoscopic displays may also convey the sensation of motion parallax. However, prior art autostereoscopic displays have many disadvantages, and commercially successful applications have been few.

One throroughly studied method for constructing an autostereoscopic display employs a lenticular screen to direct light in discrete azimuthal directions. One disadvantage of this approach is that the lateral resolution of the image disposed behind the lenticular screen must be very high, and its registration with the screen very well controlled. This is more easily achieved for a static than for a dynamic image, such as is required for an addressable display. A second disadvantage is the well-known and irritating phenomenon of "flipping" which occurs when the lenticular screen is viewed substantially off-axis, and is caused by an image intended for one lenticle of the screen being seen though an immediately adjacent lenticle.

A second type of autostereoscopic display uses parallax effects to direct different, two-dimensional images to each eye of the viewer. Examples of such displays are described in U.S. Pat. Nos. 4,829,365 and 4,717,949. However, they appear to suffer from a narrow viewing angle, unless tracking of the viewer's head position relative to the display is undertaken.

A third method for providing a laterally multiplexed, autostereoscopic display has been described in U.K. Patent Application 8816456.1. In this device, a scheme whereby a liquid crystal display may be illuminated by a scanning laser is proposed. A disadvantage, however, is the requirement of liquid crystals with very fast switching rates.

A fourth method for providing a laterally multiplexed, autostereoscopic display uses holographic techniques. Although holograms provide strikingly realistic static images, it is very difficult to adapt holographic methods to make a picture which changes in time, and which does not have the disadvantages of a small image, limited viewing angle and the requirement of a very powerful computer to handle data transformation volume and rates. A method for real-time, dynamic holographic imaging is described in "Experiments in Holographic Video Imaging", S. A. Benton, SPIE Institute Series, Vol. IS 8, SPIE, Bellingham, Wash., pp. 247–267 (1990). A variant on the use of holography is the use of holographic optical elements to combine together a series of two-dimensional images, as described in U.S. Pat. No. 4,669,812.

Direct volume display devices (DVDDs) provide a truly three-dimensional image in an addressed volume, and therefore supply all four of the physiological depth cues discussed above. One example of a DVDD is based on a mirror whose focal length is varied dynamically in correlation with images displayed on a two-dimensional screen such as a cathode ray tube (CRT). The viewer sees images of the screen focussed at various distances from the mirror, and if the presentation of these images is sufficiently fast, obtains the illusion of a three-dimensional object. Unfortunately, such a system is inherently incapable of rendering an opaque object, and has the additional disadvantage of requiring moving parts. A varifocal mirror display is described in D. G. Jansson and R. P. Kosowsky "Display of Moving Volumetric Images", *Proc. Soc. Photo-Opt. Instrum. Eng.,* 507, 82–92 (1984). A similar device, described in U.S. Pat. No. 4,834,512, uses a deformable lens instead of a mirror, but has similar drawbacks.

A third method for construction of a DVDD requires timing the image provided by a scanning laser with the rotation of a light-scattering disk. The light scattered from the disk is integrated by the viewer into a three-dimensional image. Again, solid objects cannot be rendered using this technique, only a limited number of volume elements (voxels) may be provided per refresh of the image, and moving parts are required. A rotating disk display is described in R. D. Williams and F. Garcia, Jr., "Volume Visualization Displays", *Information Display,* 5(4), 8–10 (1989).

Related to this method for a DVDD is a fourth method, described in U.S. Pat. No. 4,983,031, in which an array of light-emitting diodes (LEDs) is rotated. Again, rendering of solid objects is difficult using this technique.

Therefore, despite the approaches described above, there is still a need for a three-dimensional display providing a full range of physiological depth cues, which can render solid objects, and which requires no moving parts, and it is a primary object of this invention to provide such a display.

Other objects of the invention will be obvious and will appear hereinafter when the following detailed description is read in connection with the drawings.

SUMMARY OF THE INVENTION

Method(s) and associated apparatus are provided for the display of three-dimensional still or dynamic images in either monochrome or color. All embodiments are based on a common underlying principle of operation and each employs either a single or stack of waveguide(s) having at least two parallel, planar faces in opposed relationship.

Means are provided for selectively altering intensity or polarization of light introduced in and propagating in the waveguide at specified locations, either in the waveguide or at one or both of the aforementioned planar, parallel faces of the waveguide, in response to electrical signals.

Light emerging from the waveguide is viewed over a predetermined solid angle through a viewing face which is not the same as and not parallel to the aforementioned two parallel, planar faces.

In the devices, two-dimensional image segments are formed over predetermined portions of planes substantially parallel to the planar faces of the waveguides such that the image segments propagate along the length of the waveguide(s) to emerge over the solid viewing angle. The two-dimensional image segments form a composite image which consists of a collection of image points that have been mapped from planes parallel to the waveguides to planes in which the apparent relative positions of selected image points in the two-dimensional image segments are changed with respect to one another to create a three-dimensional visual effect.

Various addressable liquid crystal displays are used to provide static or dynamic images.

BRIEF DESCRIPTION OF THE DRAWINGS

The novel features that are considered characteristic of the present invention are set forth with particularity herein. The organization and method of operation of the invention, together with other objects and advantages thereof, will best be understood from the following description of the illustrated embodiments when read in connection with the accompanying drawings wherein:

FIG. 6 is a diagrammatic elevational view of yet another embodiment of the invention by which an image may be produced;

FIG. 7 is a diagrammatic elevational view of yet another embodiment of the invention;

FIG. 8 is a diagrammatic elevational view of still another embodiment of the invention;

FIG. 9 is a diagrammatic elevational view of still another embodiment of the invention; and FIG. 10 is a diagrammatic view, part elevational and part perspective, illustrating another embodiment and associated method of the invention.

DETAILED DESCRIPTION OF THE INVENTION

This invention relates to apparatus and associated methods by which waveguides are employed in various arrangements to display images which contain visual cues about certain spatial relationships of either real or virtual objects of interest. The images may be static or dynamic depending on the complexity of the image input portion of the various embodiments and, as well, either in monochrome or color.

Figure 1:
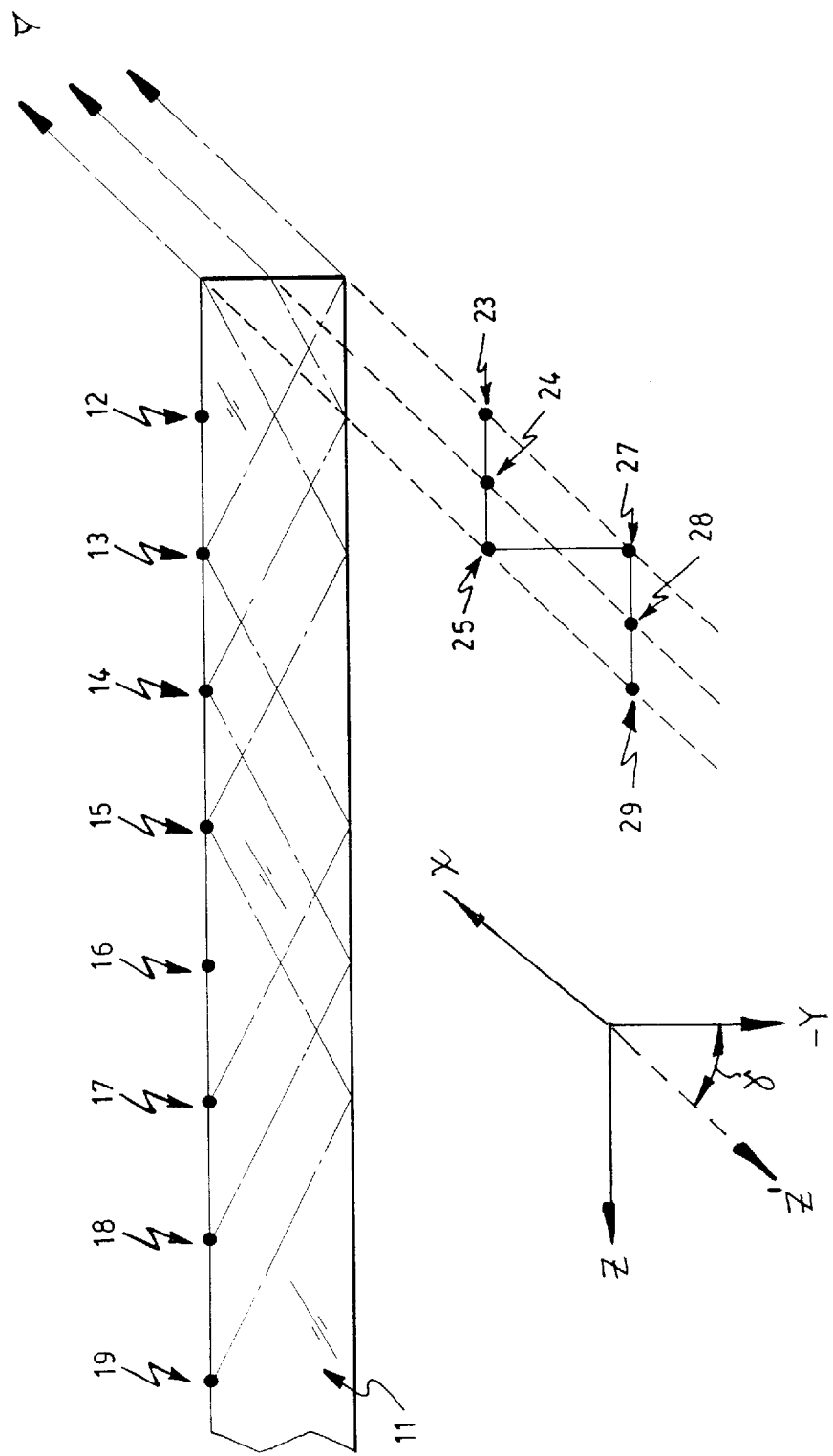
FIG. 1 is a diagrammatic elevational view of a planar waveguide of the present invention.

Reference is now made to FIG. 1 of the accompanying drawings which illustrates the principle of operation of a planar waveguide 11 of the type utilized in the various embodiments of the invention. Light rays as shown propagating in waveguide 11 remain trapped by total internal reflection when the refractive index (or dielectric constant) of the medium external to the waveguide is less than the refractive index of the material from which the waveguide is made, and the angle of incidence of the light with respect to the normal to the planar surface of the waveguide is greater than the critical angle, $\theta_c = \sin^{-1}(n_1/n_2)$, where $n_1$ and $n_2$ are the refractive indices of the medium external to the waveguide and the medium of the waveguide itself, respectively.

An observer looking into the edge of waveguide 11 as shown in FIG. 1 would be able to see changes in the intensity of light propagating in the waveguide which occurred at the points designated 13, 14 and 15 (points distributed along the length of the waveguide with reference to an x,y,z-coordinate system). However, because of the internal reflections within the waveguide, these changes in intensity would be perceived as occurring at the virtual image points 23, 24 and 25, as shown qualitatively in FIG. 1. The virtual image points exist in an x,y,z'-coordinate system which is an optical transformation of the initial x,y,z-coordinate system. Similarly, changes in the intensity of light propagating in waveguide 11 which occurred at the points 17, 18 and 19 would be perceived as occurring at virtual image points 27, 28 and 29. For a fixed viewing angle, a change in the intensity of light propagating in waveguide 11 which occurred at the point designated 16 would not be able to be seen. Total internal reflection in a planar waveguide therefore converts a two-dimensional image in a plane parallel to the planes at which total internal reflection occurs into a series of receding "step levels" when the waveguide is viewed through an edge which is perpendicular to the planes of total internal reflection. Also, an image of a nearer object, such as image 24 of point 14, blocks the view of the image of a farther object, such as image 28 of point 18. The collective action is, of course, an apparent shortening of the z-dimension in the z'-axis along with a shear angle, γ, introduced between the z-axis original orientation and its new orientation.

Figure 2:
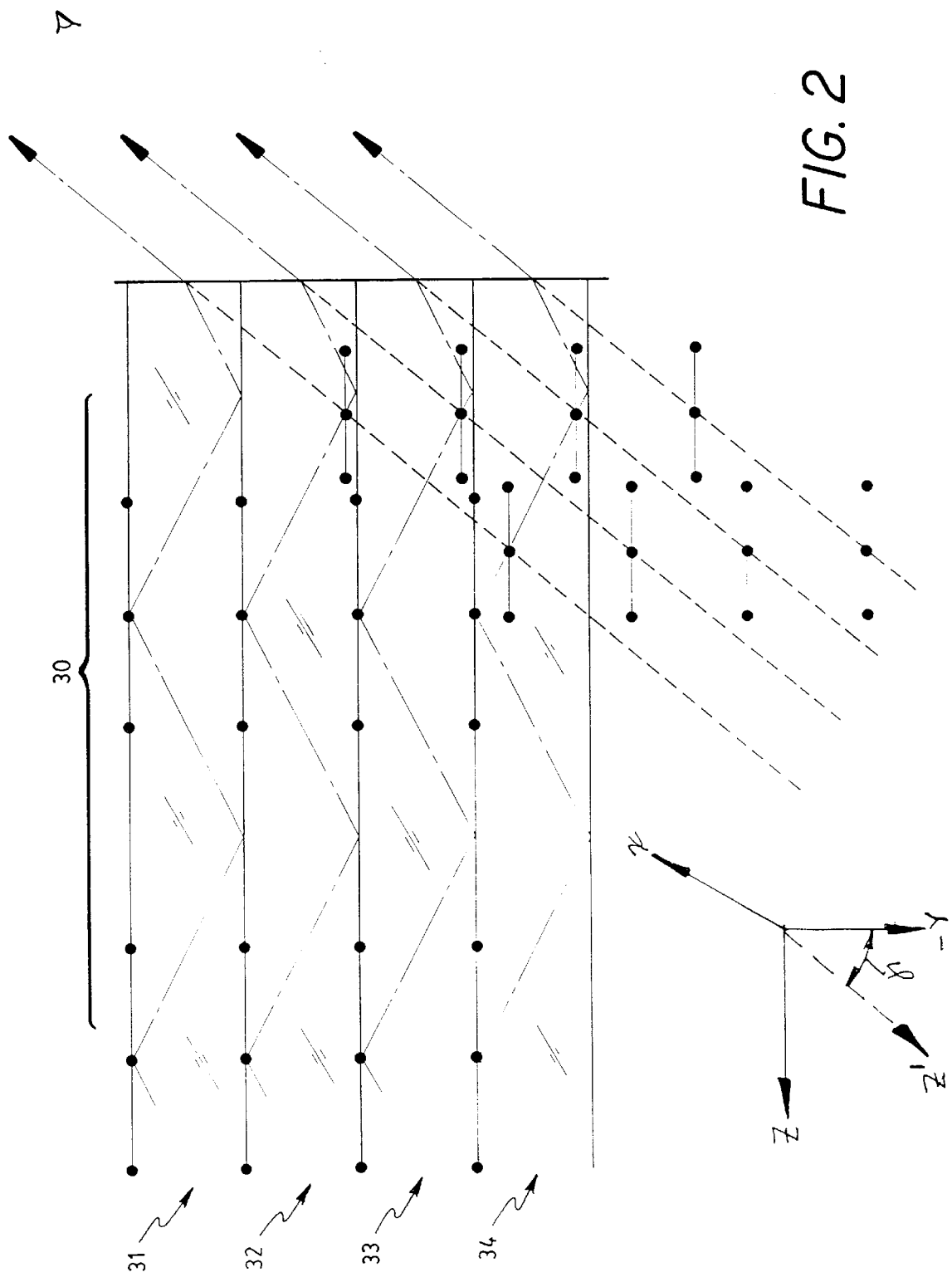
FIG. 2 is a diagrammatic elevational view of a stack of planar waveguides, utilized in one embodiment of the present invention.

Keeping the foregoing principle in mind, reference is now made to FIG. 2, which shows a plurality of planar waveguides arranged in a stack designated generally at 30. Stack 30 comprises for illustration purposes four waveguides, 31, 32, 33 and 34, but more may be used as needed. Each waveguide is viewed through an edge not parallel to the planes at which total internal reflection occurs; two-dimensional images in planes parallel to the planes at which total internal reflection occurs (resulting in changes in the intensity of light propagating in the waveguides) are perceived as parts of a three-dimensional image.

It is not necessary for the stack of waveguides 30 to be transparent in three dimensions. Because light is "folded through" the display by total internal reflection, one dimension may absorb light. This dimension, corresponding to planes parallel to the planes of total internal reflection, is available for incorporation of opaque elements such as the electrodes which may be required to address the display.

In a system such as that shown in FIG. 2, a point described in Cartesian coordinates as (x,y,z), where x represents the horizontal, y the vertical, and z the depth dimensions, is represented in a display composed of stack 30 of planar waveguides, each addressable with two-dimensional images described in Cartesian coordinates as (x,z), where the x-axis is parallel to the viewing edge and the z-axis is perpendicular to the viewing edge.

The z'-coordinate of the three-dimensional image is related to the y-coordinate of each two-dimensional image; and The y coordinate of the three-dimensional image is divided into discrete pixel planes, each pixel plane corresponding to a different waveguide in the stack.

The Cartesian (x,z) coordinates in each planar waveguide do not map directly to Cartesian (x,z') coordinates of the three-dimensional image. This is because totally internally reflected light cannot be seen if the planar waveguide is viewed in a direction exactly parallel to the planes in which total internal reflection occurs. The waveguides must be viewed at an angle relative to the normal to the planes of total internal reflection between the critical angle for total internal reflection defined above and 90°, and preferably about midway between these two values. The three-dimensional space addressed by a cubic display viewed at such an angle is a parallelipiped, so (x,z) actually maps to (x,z') as shown, where the z' axis is perpendicular to the x axis but not to the y axis.

The plane in which the two-dimensional image (x,z) is provided, which is parallel to or the same as one or both of the planes in which total internal reflection occurs in the waveguide, will hereinafter be referred to as the (x,z') plane.

It is possible to simplify certain aspects of the inventive display so that only one waveguide is required, but to do this requires additional computational complexity. As described above, when the display comprises a stack of planar waveguides, the y coordinate of the three-dimensional image displayed is divided into discrete pixel planes, each pixel plane corresponding to a different waveguide in the stack. For some applications, however, it may be disadvantageous for the display to consist of a stack of planar waveguides as will be seen more fully hereinafter with reference to FIGS. 6 and 8. For instance, it would be difficult to use either of the methods described hereinafter in which a waveguide is addressed by light for formation of the image in the (x,z') plane (i.e., the methods illustrated in FIGS. 6 and 8) in a stack of waveguides for the obvious reason that addressing a waveguide in the middle of the stack would be highly impractical. In these cases, a method by which it is possible to obtain a three-dimensional image from a single planar waveguide is preferred.

Figure 3:
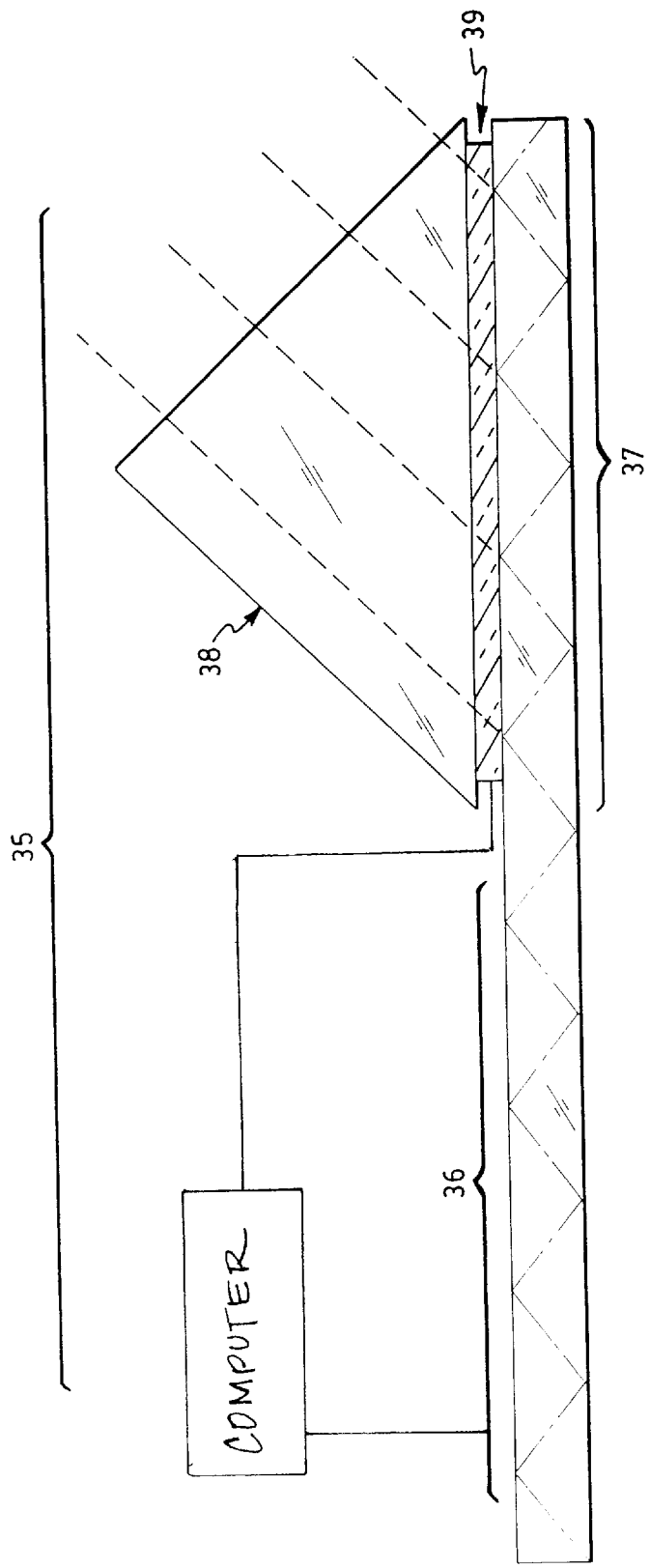
FIG. 3 is a diagrammatic elevational view of another embodiment of the present invention illustrating a method for coupling light out of a planar waveguide.

Such a method and apparatus is illustrated in FIG. 3 to which reference is now made. An (x,z') two-dimensional image in a section 36 of waveguide 35 may be obtained by one of the techniques described in detail below. However, instead of being viewed through its edge, waveguide 35 of FIG. 3 comprises a further section 37 out of which light may be coupled to a prism 38, and thence to the viewer, by means of an electrically addressable "light valve" 39. "Light valves" are discussed in more detail below, and the mechanism of the "light valve" may, for instance, be either of the two mechanisms for providing "light valves" described below. The "light valve" permits light to escape from the waveguide in a selected plane, and each of the planes which may be selected corresponds to a different value of the y-coordinate of the three-dimensional image.

Two costs of simplifying the display in the manner shown in FIG. 3 are that opaque objects may not be rendered and a means for very rapid addressing of the display is needed. This is because it is a feature of the design shown in FIG. 3 that only one "horizontal slice", corresponding to only one value of the y coordinate of the three-dimensional image, may be seen at a time. To display a three-dimensional picture, it is necessary to switch between the y "slices" sufficiently rapidly that the images are integrated by the brain to form a continuous, three-dimensional image. To be specific, a sequence of image slices would be: $(x_{y1}, y_1, z'_{y1})$, $(x_{y2}, y_2, z'_{y2})$, $(x_{y3}, y_3, z'_{y3})$, . . . , where $(x_{yn}, y_n, z'_{yn})$ is the nth horizontal slice of the three-dimensional image, and is the two-dimensional image $(x_{yn}, z'_{yn})$. This imposes a requirement on the speed of addressing of the $(x_{yn}, z'_{yn})$ two-dimensional images. For flickering not to be observed, the entire image should be refreshed at the flicker fusion rate for the human visual system.

Either the stack of waveguides or the single waveguide embodiment of the present invention requires a method for the formation of an image in the (x,z') plane of a planar waveguide in response to electrical signals, these electrical signals being the output of, for instance, any suitable well-known computer as shown schematically in FIG. 3.

There are several applicable methods and apparatus for modulating the intensity of light propagating in a planar waveguide in response to electrical signals applied in the (x,z') plane. Light can be:

a) admitted to the waveguide at points (x,z') or escape the waveguide at points (x,z');

b) be absorbed or generated at points (x,z') in the waveguide; or c) be changed in polarization at points (x,z') in the waveguide.

Figure 4:
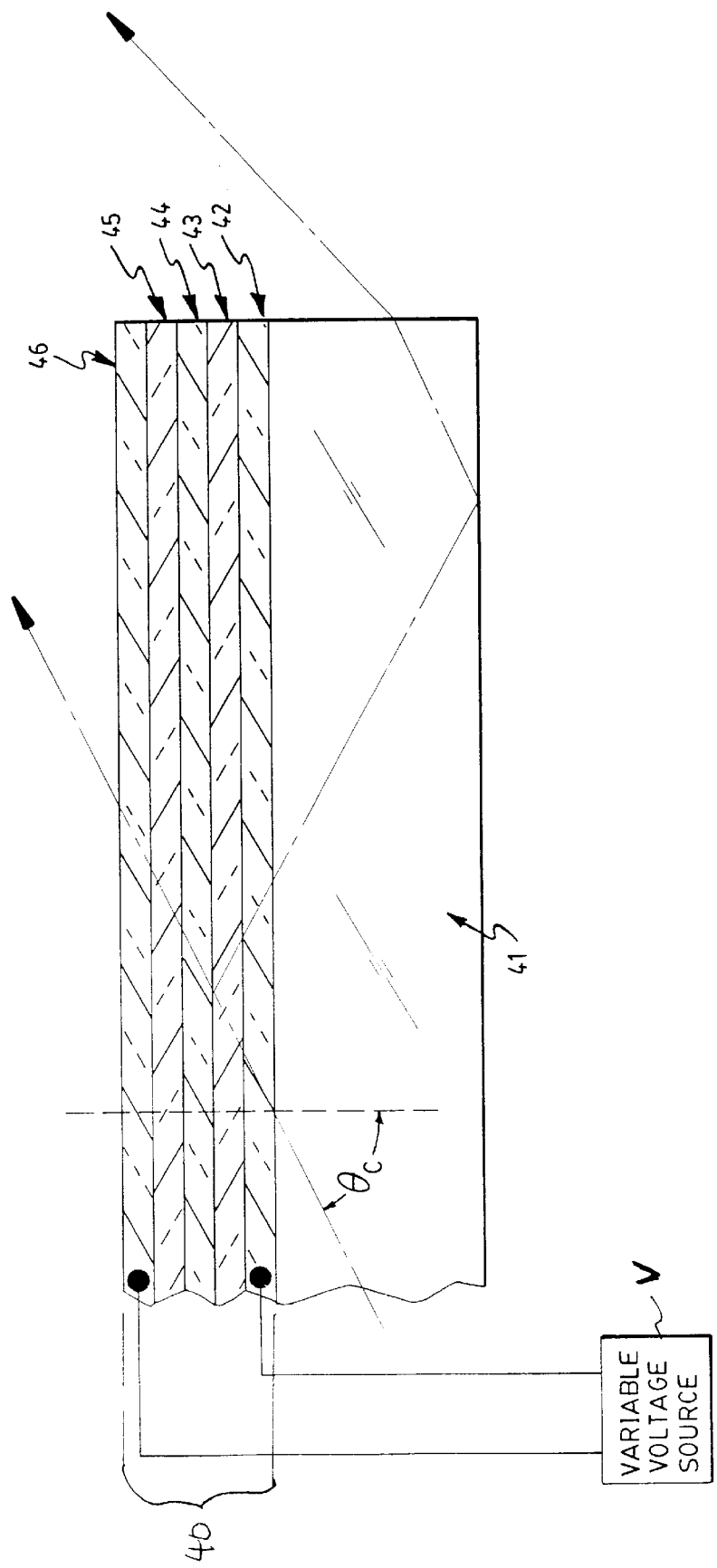
FIG. 4 is a diagrammatic elevational view illustrating how to provide an image in a planar waveguide arrangement of the present invention.

A method to permit light to escape a planar waveguide is described in G. Labrunie and S. Valette, Applied Optics, 1974, 13, 1802; a two-dimensional display using a similar principle is disclosed in U.S. Pat. No. 4,822,145. As shown in FIG. 4, a liquid crystal cell 40 is placed adjacent a planar waveguide 41. This consists of transparent electrode layer 42, optional liquid crystal alignment layer 43, liquid crystal layer 44, a second optional liquid crystal alignment layer 45 and a second, not necessarily transparent electrode layer 46. Electrodes 42 and 46 are connected to a variable voltage source, V. The dielectric constant of the liquid crystal and that of the waveguide (and layers 42 and 43) define a critical angle, $\theta_c$, (relative to the normal of the plane of reflection) for total internal reflection. The dielectric constant of the liquid crystal material may be varied by means of an electric field applied through electrodes 42 and 46, thereby changing the critical angle for total internal reflection. Light which is trapped within the waveguide 41 without application of the electric field to the liquid crystalline material may escape the waveguide when the electric field is applied, if this results in an increase of critical angle for total internal reflection (with respect to the normal to the plane of reflection). Light may also be selectively coupled into a waveguide using a mechanism of this type.

Figure 5:
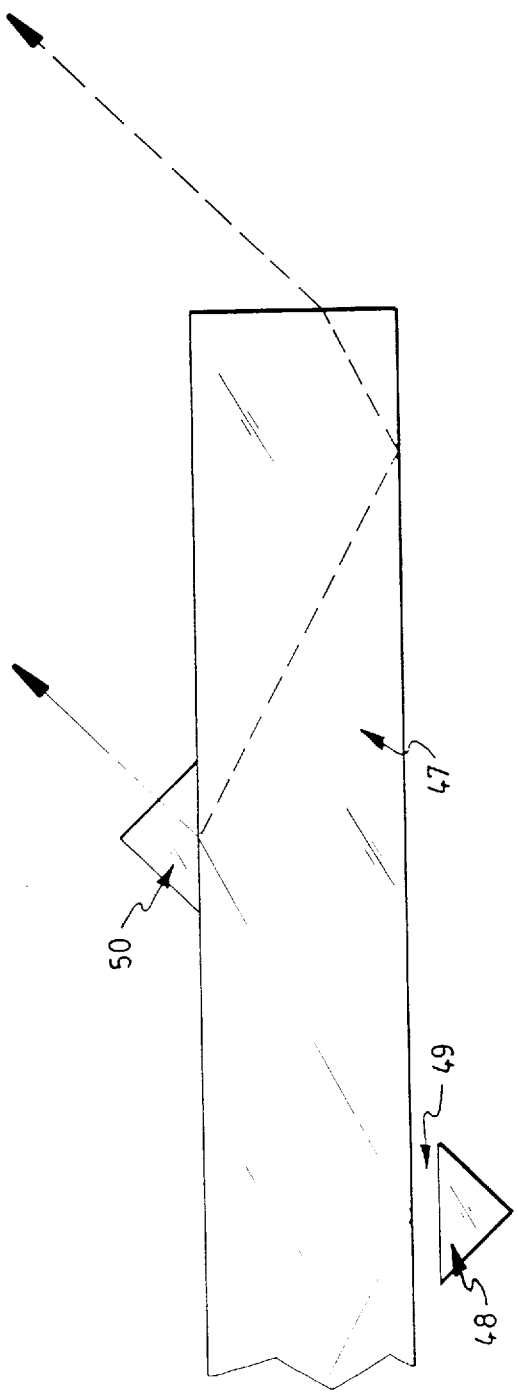
FIG. 5 is a diagrammatic elevational view illustrating another embodiment of the invention by which an image may be produced.

A second method to permit light to escape a planar waveguide is to mechanically bring a material into optical contact with the waveguide at the desired point (x,z'), in response to an electrical signal, as shown in FIG. 5. Total internal reflection occurs uninterrupted in waveguide 47 when elements 48 and 50, of refractive index greater than the medium 49 external to the waveguide, are separated from the waveguide by a gap composed of that medium. Typically, medium 49 will be air. Element 48 is shown separated from the waveguide in FIG. 5. When an element is mechanically brought into contact with waveguide 47 in response to an electrical signal, as might be achieved for example by use of a piezoelectric material, light is coupled out of the waveguide at the point of contact. Element 50 is shown in such contact with waveguide 47.

The two methods described above for allowing light to selectively escape from the waveguide in response to an electrical signal are herein referred to as "light valves".

A third method and associated apparatus to permit light to escape from a planar waveguide is shown in FIG. 6. Incorporated into a waveguide 51 is a layer 53 of a substantially non-scattering, liquid crystalline material which may be converted to a light-scattering form by application of an electric field. Layer 53 obviously operates as this structure's core since it is surrounded by a media of lower index of refraction. Transparent electrodes 52 and 54 provide a means for impressing a variable voltage across layer 53. When a voltage is applied to electrodes 52 and 54, light is scattered in all directions. Some light is scattered at less than the critical angle for total internal reflection, and therefore escapes the waveguide 51.

A method and associated apparatus for admitting light to a waveguide is shown in FIG. 7. A small proportion of the surface area of one of the planar faces of a waveguide is provided with small, prismatic elements 71. Collimated light, from a laser, for example, which strikes a face of a prismatic element 71, which is not parallel to the plane of total internal reflection, is admitted to the waveguide. Of course, light is coupled out of the waveguide by the small prismatic elements, but the losses will be kept to a minimum if the proportion of the surface area of the waveguide which is occupied by the prismatic elements is minimized.

A method and associated apparatus for making the two-dimensional image in the (x,z') plane by absorbing light within the waveguide is shown in FIG. 8. Materials are known which are substantially transparent in one oxidation state, but highly absorbing in another. The transition between one state and another may be reversible, and may be effected by passing an electric current through the material, thereby effecting electrolysis. Such materials are often referred to as electrochromic, an example being a well-known viologen salt. As shown in FIG. 8, a waveguide 81 incorporates transparent electrodes 82 and 83 between which is placed a layer 84 of an electrochromic material. When a current is passed between electrodes 82 and 83, the electrochromic material is converted from the transparent oxidation state to the absorbing oxidation state.

A method and associated apparatus for making the two-dimensional image in the (x,z') plane by generating light within the waveguide is shown in FIG. 9. A fluorescent material is incorporated into a waveguide 85 which, when irradiated with light at one wavelength, emits light at a second, longer wavelength. The irradiation may be provided by, for example, a laser. It may also be provided by the output from a CRT equipped with a fiber-optic face-plate. In either case, the incoming light 86 will be directional. However, for an isotropic fluorescent material incorporated into waveguide 85, the fluorescence will also be isotropic. The consequence is that light may enter the waveguide at an angle to the normal to the plane of total internal reflection which is less than the critical angle; however, a proportion of the fluorescence will be emitted at angles to the normal to the plane of total internal reflection which are greater than the critical angle. Such fluorescence will be trapped within the waveguide, and will give the impression to the viewer of having been generated at the point where the excitation beam entered the waveguide.

FIG. 10 shows a method and associated apparatus for changing the polarization of light propagating within a planar waveguide, and using this change in polarization to form a visible image. A layer of liquid crystal material 94 is incorporated within a waveguide 91, sandwiched between transparent electrodes 92 and 93. The liquid crystalline material is aligned such that light polarized horizontally by polarizer 95 is unchanged in polarization when passing through the waveguide. One way to achieve this is to align the long axis of a nematic liquid crystalline material with the electric vector of the propagating light. After passing through waveguide 91, the horizontally polarized light is blocked by a second polarizer 96 which is aligned vertically. When an electric field is applied to the liquid crystalline material by means of electrodes 92 and 93, the alignment of the molecules comprising the liquid crystal is changed, such that now the electric vector of the propagating light is not parallel to the long axis of the liquid crystal molecules. The phase of the propagating light is consequently changed, so that the light has an electric vector component which is not blocked by the second, vertically aligned polarizer. A viewer looking into waveguide 91 therefore sees a bright image, corresponding to the point at which the electric field was applied, against a dark background.

Although the general principle of the planar waveguide display as described above pertains to monochrome displays, it is possible to adapt the principles outlined to make a trichrome display. In general, the display may be adapted by changing the "backlighting" conditions. Instead of being illuminated by a monochrome source, different waveguides within a stack may, for example, be illuminated by differently colored sources. Alternatively, the entire display may be alternately lit with red, green and blue sources, timed to coincide with different three-dimensional images corresponding to the particular color separation of the desired image. Such alternation of illumination must be effected sufficiently rapidly for the viewer not to perceive a flickering effect.

While the invention has been described with reference to preferred apparatus and methods, it will be apparent to those skilled in the art that various changes and modifications may be made therein without departing from the scope of the invention as set forth in the claims.

What is claimed is:

1. Apparatus for displaying three-dimensional images, said apparatus comprising:
   at least one thin waveguide having a pair of spaced apart substantially parallel, opposed, planar faces, said faces serving to propagate radiation along the length of said waveguide;
   means for forming two-dimensional image segments over predetermined portions of a plane substantially parallel to said planar faces of said waveguide such that said image segments are coupled into said waveguide and propagate along the length of said waveguide;

means for selectively changing the content of said two-dimensional image segments to form a composite image; and, means for selectively coupling out said composite image into a predetermined solid viewing angle, said means for selectively coupling disposed proximate one end of said waveguide, said composite image consisting of a collection of image points that have been mapped from planes parallel to said waveguides to tilted planes lying substantially within said solid viewing angle, in which tilted planes the apparent relative positions of selected image points in said image segments are changed with respect to one another to create a three-dimensional visual effect in said composite image, said means for forming two-dimensional image segments and said means for selectively coupling out said composite image being physically separated to provide different optical path lengths between different portions of said two-dimensional image segments to provide said three-dimensional effects.

2. The apparatus of claim 1 wherein said means for forming two-dimensional image segments is distributed over one of said planar faces of said waveguide.

3. The apparatus of claim 2 wherein said means for forming two-dimensional image segments comprises an addressable liquid crystal array.

4. The apparatus of claim 1 wherein said means for forming two-dimensional image segments comprises an addressable liquid crystal birefringent array located in a plane parallel to said planar faces of said waveguide in combination with a pair of linear polarizers located exterior to said waveguide.

5. The apparatus of claim 1 wherein said means for forming two-dimensional image segments comprises an addressable fluorescent array.

6. The apparatus of claim 1 wherein said means for forming two-dimensional image segments comprises an addressable liquid crystal array structured to selectively scatter light in response to the application of an electric field and serves as the core of said waveguide.

7. Apparatus for displaying three-dimensional images, said apparatus comprising:

a plurality of thin waveguides arranged in stacked relationship so that they are optically isolated from one another, each of said waveguides having a pair of spaced apart substantially parallel, opposed, planar faces and a thin exit facet at one end of said waveguide, said exit facet disposed at a predetermined angle with respect to and extending between said planar opposed faces;

means for forming two-dimensional image segments over predetermined portions of planes substantially parallel to said planar faces of said waveguides such that said image segments are coupled into said waveguides and propagate along the length of said waveguides; and means for selectively changing the content of said two-dimensional image segments to form a composite image viewable within a predetermined solid viewing angle at said exit facet, which composite image consists of a collection of image points that have been mapped from planes parallel to said waveguides to tilted planes lying substantially within said solid viewing angle, in which tilted planes the apparent relative positions of selected image points in said image segments are changed with respect to one another to create a three-dimensional visual effect, said means for forming two-dimensional image segments being physically separated from said exit facet to provide different optical path lengths between different portions of said two-dimensional image segments to provide said three-dimensional effects.

8. The apparatus of claim 7 wherein means for forming two-dimensional image segments is distributed over one of said planar faces of each of said waveguides.

9. The apparatus of claim 8 wherein said means for forming two-dimensional image segments comprises an addressable liquid crystal array.

10. The apparatus of claim 7 wherein said means for forming two-dimensional image segments comprises an addressable liquid crystal birefringent array located on one of said planar faces of each of said waveguide in combination with a pair of linear polarizers located exterior to said waveguides.

11. The apparatus of claim 7 wherein said means for forming two-dimensional image segments comprises an addressable fluorescent array located on a planar face of each of said waveguides.

12. The apparatus of claim 7 wherein said means for forming two-dimensional image segments comprises an addressable liquid crystal array structured to selectively scatter light in response to the application of an electric field and serves as the core of each of said waveguides.

13. Apparatus for displaying three-dimensional images, said apparatus comprising:

a thin waveguide having a pair of spaced apart substantially parallel, planar, opposed, faces arranged to propagate light the length of said waveguide;

means for coupling out light propagating in said waveguide so that it can be observed over a predetermined solid viewing angle, said means for coupling out light disposed proximate a first end of said waveguide;

means for forming two dimensional image segments in a plane substantially parallel to and coextensive with a given area of a portion of said faces of said waveguide at the end thereof opposite to said first end; and means for selectively changing the content of the image segments over said given area at least at the flicker fusion rate for the human visual system to form a composite image within said solid viewing angle which composite image consists of a collection of image points that have been mapped from planes parallel to said waveguides to tilted planes lying substantially within said solid viewing angle, in which tilted planes the apparent relative positions of selected image points in said image segments are changed with respect to one another to create a three-dimensional visual effect, said means for forming two-dimensional image segments and said means for selectively coupling out radiation being physically separated to provide different optical path lengths between different portions of said two-dimensional image segments to provide said three-dimensional effects.

14. The apparatus of claim 13 wherein said means for coupling comprises a prism having one face for viewing said three-dimensional visual effect.

15. The apparatus of claim 13 wherein means for forming two-dimensional image segments is distributed over one of said planar faces of said waveguide.

16. The apparatus of claim 15 wherein said means for forming two-dimensional image segments comprises an addressable liquid crystal array.

17. The apparatus of claim 13 wherein said means for forming two-dimensional image segments comprises an addressable liquid crystal birefringent array located on a plane parallel to said planar faces of said waveguide in combination with a pair of linear polarizers located exterior to said waveguide.

18. The apparatus of claim 13 wherein said means for forming two-dimensional image segments comprises an addressable fluorescent array.

19. The apparatus of claim 13 wherein said means for forming two-dimensional image segments comprises an addressable liquid crystal array structured to selectively scatter light in response to the application of an electric field and serves as the core of said waveguide.

20. A method for displaying three-dimensional images, said method comprising the steps of:

coupling radiation into at least one thin waveguide having a pair of spaced apart substantially parallel, opposed, planar faces;

forming two-dimensional image segments over predetermined portions of a plane substantially parallel to said planar faces of said waveguide and coupling radiation from said image segments into said waveguide such that said image segments propagate along the length of said waveguide;

selectively changing the content of said two-dimensional image segments to form a composite image; and, selectively coupling out said composite image into a predetermined solid viewing angle proximate one end of said waveguide, which said composite image consists of a collection of image points that have been mapped from planes parallel to said waveguides to tilted planes lying substantially within said solid viewing angle, in which tilted planes the apparent relative positions of selected image points in said image segments are changed with respect to one another to create a three-dimensional visual effect in said composite image, said two-dimensional image segments and the point at which said composite image is selectively coupled out being physically separated to provide different optical path lengths between different portions of said two-dimensional image segments to provide said three-dimensional effects.

21. The method of claim 20 wherein said step of forming two-dimensional image segments distributes them over one of said planar faces of said waveguide.

22. The method of claim 20 wherein said step of forming two-dimensional image segments utilizes comprises selectively addressing a liquid crystal array.

23. The method of claim 20 wherein said means for forming two-dimensional image segments comprises an addressable liquid crystal birefringent array located on a plane parallel to said planar faces of said waveguide in combination with a pair of linear polarizers located exterior to said waveguide.

24. The method of claim 20 wherein said step for forming two-dimensional image segments comprises an selectively addressing a fluorescent array.

25. The method of claim 20 wherein said step for forming two-dimensional image segments comprises addressing a liquid crystal array structured to selectively scatter light in response to the application of an electric field and serves as the core of said waveguide.

\* \* \* \* \*